United States Patent [19]

Besong, Jr.

[11] Patent Number: 5,029,785
[45] Date of Patent: Jul. 9, 1991

[54] CAR MOUNTED ARTICLE CARRYING BRACKET

[76] Inventor: James A. Besong, Jr., 157 Knobvue Estates, Freedom, Pa. 15042

[21] Appl. No.: 525,619

[22] Filed: May 21, 1990

[51] Int. Cl.$^5$ .............................................. A47B 96/06
[52] U.S. Cl. .................................. 248/205.1; 224/325
[58] Field of Search ............... 224/309, 317, 321, 324, 224/325, 326, 327, 329, 42.45 R; 248/205.1

[56] References Cited

U.S. PATENT DOCUMENTS

| | | | |
|---|---|---|---|
| 2,528,794 | 11/1950 | Seidler | 224/331 X |
| 2,589,772 | 3/1952 | Carter | 224/325 X |
| 2,630,995 | 3/1953 | Carlson | 224/317 X |
| 3,001,309 | 9/1961 | Schaefers | 224/317 X |
| 3,709,413 | 1/1973 | Nelson | 224/329 X |
| 3,904,092 | 9/1975 | Piper | 224/321 X |
| 4,182,467 | 1/1980 | Graber | 224/309 |

Primary Examiner—J. Franklin Foss
Attorney, Agent, or Firm—Paul Bogdon

[57] ABSTRACT

A car-mounted article carrying bracket is disclosed. The bracket includes inner and outer upright members joined at their respective lower ends to define an article receiving section. An arm element extends inwardly from a lower section of the inner member. Secured to the arm element is a car engaging member shaped to be received and firmly secured in a joint between either the hood and fender or trunk lid and fender of a car. Struts are provided from the upright members. A brace shaped to engage the fender of a car to which the bracket is secured is fixed to the lower sections of the struts, and serves to assist in supporting the bracket in its article receiving orientation. One each of the brackets may be secured to the hood and trunk of a car whereby long articles may be supported by the brackets. An elastic tie-down rope wrapped around the upright members or around one of the members and a strut serves to hold the carried articles in place.

7 Claims, 2 Drawing Sheets

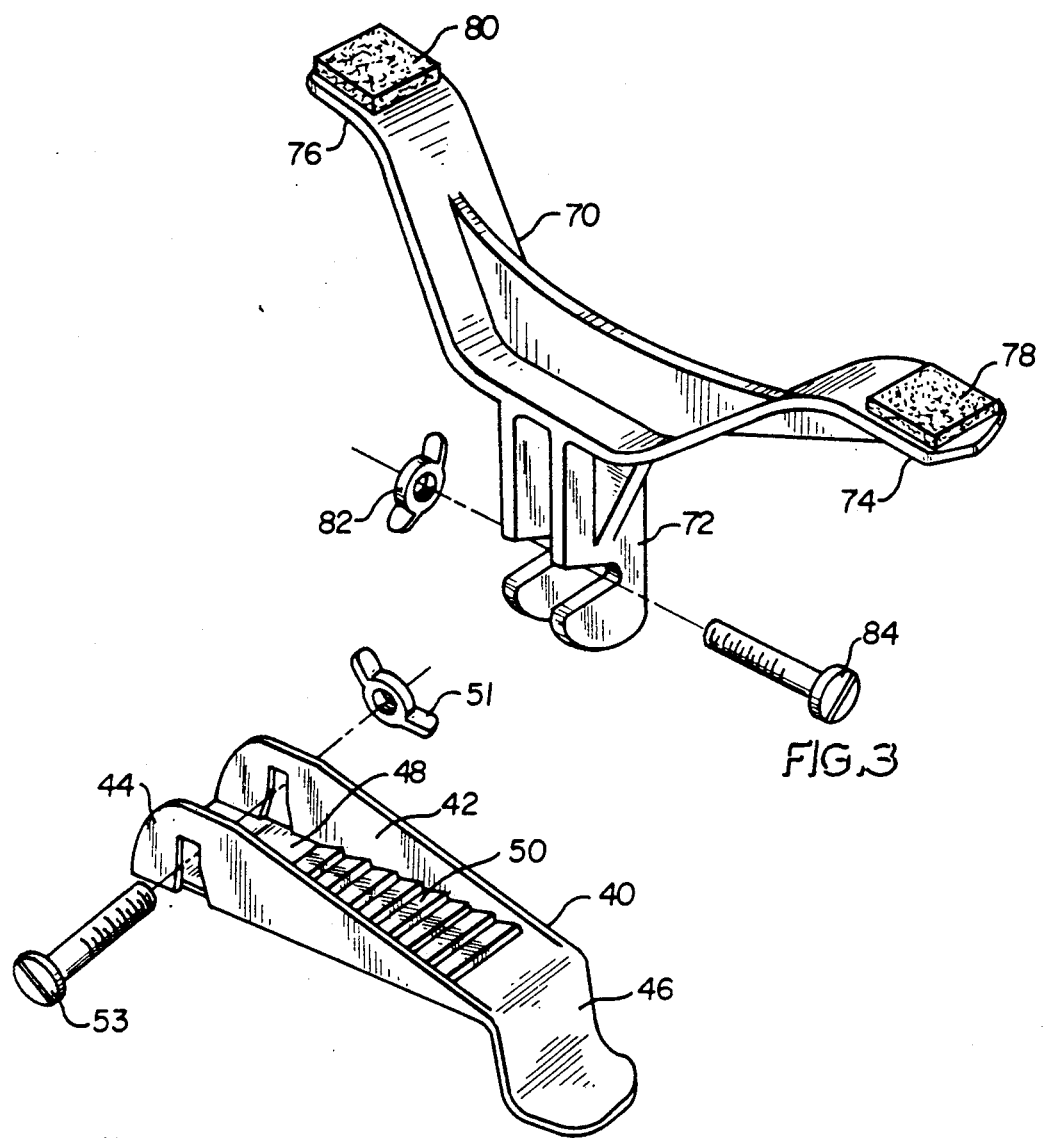
FIG. 3
FIG. 4
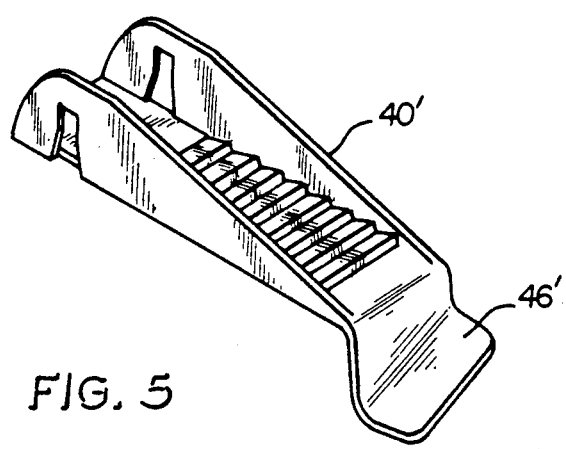
FIG. 5

CAR MOUNTED ARTICLE CARRYING BRACKET

BACKGROUND OF THE INVENTION

This invention relates to an article carrying bracket which would be mounted on the trunk or hood sections of a car, and particularly to a bracket suited when a pair of them are used, to carrying long articles such as lumber, ladders, gutters and downspouts, skis, and the like.

Heretofore, when a person whose only means of transportation was a car needed to transport long articles they would tie them to the car roof or place them in the car with some portion extending through one of the car's windows. Such manners of carrying long articles were often unstable, unsafe, awkward, ineffective and sometimes damaging to the interior or exterior of the car. Special roof racks have been available for transporting any form of articles. Specially designed roof and trunk racks have been available for transporting articles such as skis. Not only have the various roof and trunk racks been expensive to purchase, some have been ineffective for their intended purposes. It has also been reported that racks have been stolen from the cars. Ski racks have been known to be favorite targets of rack thieves.

This invention overcomes the awkward and potentially hazardous drawbacks of carrying long articles on or in cars, and the inherent limitations of the previously known specially designed trunk and roof racks, by providing a bracket which may be simply mounted to either or both the trunk or hood sections of most cars. Two of my brackets may be used, one secured to a car's hood section and another to its trunk section. The mounting of the brackets to the car is achieved without the need of any tools. Any long articles such as ladders, lumber, gutters, downspouts, pipe, wood trim, tubing, skis, track and field poles, and the like, are received between the brackets and simply held against movement by removable elastic tie down straps or ropes. When not in use the brackets may be easily and quickly removed from the car and stored conveniently in the trunk or interior of the car. The main body of my bracket may be formed by injection molding in a single piece. Two other support pieces, also capable of being injection molded in single pieces, are adjustably secured to the main body of the bracket. Forming the bracket of essentially three main pieces allows the entire assembly to be produced at a cost low enough to market a pair of the brackets at a price readily affordable to the consumer. Articles such as skis, bicycles, surfboards, and the like, may be carried by a pair of the brackets both mounted to a car's hood section. Thus, my invention overcomes the deficiencies of car transportation of long articles by a unique bracket which is simple to use, easily mounted to a car, relatively inexpensive to produce, safe in its use and versatile in its applications.

SUMMARY OF THE INVENTION

This invention provides a car-mounted article carrying bracket which in its broadest form preferably comprises: an upright inner article engaging member; an upright outer article engaging member spaced from the inner member; a base member interconnected between the lower ends of the inner and outer members to define with the inner and outer members an article receiving section; an arm element fixed to and extending inwardly from a lower end portion of the inner member; a car engaging member having an outer end section removably secured to the arm element and an inner end section shaped to be received in a joint between a fixed car panel and a movable car panel, movable between an open and closed portion, such a joint typified by the ones between a car's trunk lid or hood and the adjoining panels; struts extending downwardly from the lower end sections of the inner and outer members; and a brace secured to the lower ends of the struts for firmly engaging a side section of a car when the car engaging element is secured to the car in the trunk lid or hood joint. The bracket is simply mounted to a car by placing the inner end of the car engaging member on the lower portion of either a hood or trunk joint and closing the hood or trunk lid onto the member. The outer end of the car engaging member is then secured to the arm element whereby the bracket is in place. The brace is secured to the bracket with the inner end of the brace firmly engaging the car's fender. By mounting one bracket on the car's hood section and another on on its trunk section, long articles may then be supported by the pair of brackets. Included with each bracket could be an elastic tie down strap or rope which may be extended between two or more of the upright members and struts to secure the articles on the brackets.

The bracket of my invention may be modified in various manners. Either or both of the car engaging member and the brace may be selectively adjustable in position with respect to the arm element and struts, respectively, so as to accommodate cars of various dimensioned fenders, hoods, and trunk lids. Interconnecting teeth-like serrations may be provided on the arm element and the car engaging member for positively fixing the positions of the car engaging member and arm element with respect to each other. Also, soft padding may be fixed to the fender engaging inner end of the brace preventing scratching or marring the fender.

Various other advantages, details and modifications of the present invention will become apparent as the following description of a certain present preferred embodiment proceeds.

DESCRIPTION OF THE DRAWINGS

In the accompanying drawings I show a certain present preferred embodiment of my invention in which:

FIG. 3 is a perspective view of the brace of the bracket;

FIG. 4 is a perspective view of the car engaging element of the bracket and

FIG. 5 is a perspective view of a modified version of the car engaging member forming a part of the present invention.

DESCRIPTION OF A PREFERRED EMBODIMENT

Figure 1:
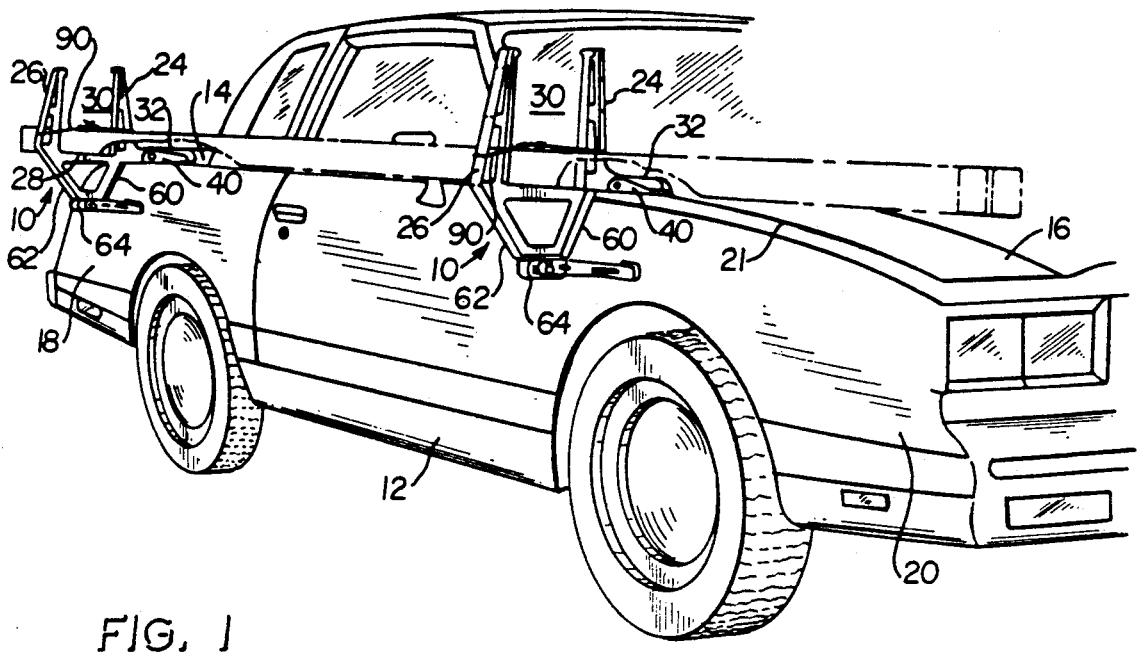
FIG. 1 is a perspective view showing a pair of article carrying brackets of the present invention used in conjunction with a car.
Figure 2:
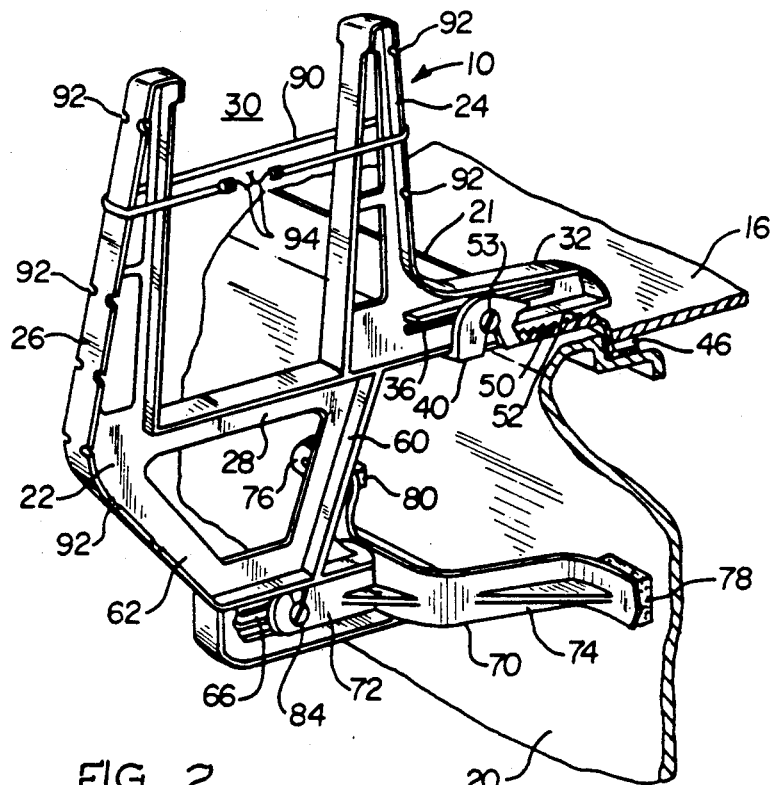
FIG. 2 is an enlarged perspective view through the hood of the car of FIG. 1 showing the manner in which the bracket of the present invention is secured in place, and showing details of construction of the bracket.

Referring now to the drawings there is shown in FIG. 1 a pair of the article carrying bracket 10 of the present invention secured in place to a conventional car 12 which includes several movable panel members such as trunk lid 14 and hood 16, and several fixed panel members such as rear fender 18 and front fender 20. The trunk lid 14 and hood 16 are movable relative to rear fender 18 and front fender 20, respectively, between an open position (not shown) and a closed position. When the trunk lid 14 and hood 16 are in their open positions, a wide space is formed between the trunk lid 14 and rear fender 18, and between the hood 16 and front fender 20. However, when the trunk lid 14 and hood 16 are in their closed positions, a joint 21 is formed between the trunk lid 14 and rear fender 18 and between the hood 16 and front fender 20. At joint 21 the edges of the respective adjacent panels are in closely spaced relation. Typically, the trunk lid 14 and rear fender 18 and hood 16 and front fender 20 are each, respectively, in a leakproof engagement.

The article carrying brackets 10, as shown, are formed to be secured in place with car 12 for carrying long articles such as ladders, lumber, gutters, downspouts, pipe, tubing, wood trim, skis, track and field poles, and the like, all of which are too long to be carried in the car's trunk, or not easily and safely carried in the car's interior or on the car's roof. Each bracket 10 has three essential parts which may be formed by injection molding from a high strength plastic resin. Bracket 10 includes a main body 22 having an elongation upright inner member 24 and an elongated upright outer member 26 spaced from and generally parallel to the inner member 24. The lower ends of the inner member 24 and outer member 26 are interconnected by a base member 28 and together define an article carrying section 30. A elongated arm element 32 extends inwardly from a lower end section of the inner member 24. A longitudinally extending slot 36 is formed generally centrally of the arm element 32.

An elongated car engaging member 40 is longitudinally adjustably secured to the arm element 32. The car engaging element 40 has a channel-like shape, including a pair of identically shaped parallel tapering ears 42 and 44 with wide outer ends tapering to an inner end 46 shaped to conform generally to the shape of joint 21 between trunk lid 14 and rear fender 18, or hood 16 and front fender 20. The ears 42 and 44 are jointed at their lower portions by a flat base 48 extending from the inner end 46 and upon which are formed tooth-like serrations 50 sized and shaped to mate with similarly shaped serrations 52 found on the underneath surface of arm element 32. The ears 42 and 44, and base 48 are sized and shaped such that the car engaging member 40 snugly fits on the arm element 32. The car engaging member 40 is secured to the arm element 32 by tightening a wing nut 51 onto a bolt 53 extending through openings provided in the outer ends of ears 42 and 44, the bolt 52 passing through the slot 36 in the arm element 32. The car engaging member 40 may be selectively positioned on the arm element 32 to accommodate different cars. The interconnecting serrations 50 and 52 between the car engaging member 40 and arm element 32, provide surface elements for fixing the position of the car engaging member 40 and arm element 32 with respect to each other.

An inner strengthening strut 60 and an outer strengthening strut 62 extend obliquely downwardly from the lower ends of the inner member 24 and outer member 26, respectively. The lower end of the struts 60 and 62 are connected by an elongated foot member 64 which is generally parallel to the arm element 32. A longitudinally extending slot 66 is provided through a central region of the foot member 64. Snugly, yet movably, received on foot member 64 is a generally T- or Y-shaped brace 70 stem having a yoke-like central leg or stem 72 formed of generally parallel members spaced to fit over the foot member 64. Radially extending arms 74 and 76 are secured to the inner end of the stem 72. The arms 74 and 76 are sized and shaped such that the free ends will engage the surface of the rear fender 18 or front fender 20 when the car engaging member 40 is secured in a joint 21 between the trunk lid 16 and rear fender 18 or hood 14 and front fender 20. Soft rubber-like pads 78 and 80 are fixed to the free ends of arms 74 and 76 to prevent any marring or scratching of the fenders. The brace 70 is secured to the foot member 64 by a wing nut 82 tightened onto a bolt 84 extending through openings provided in the stem 72 and passing through the slot 66. The brace 70 may be selectively positioned on foot member 64 to accommodate cars of different sizes and dimensions.

When using the article carrying bracket 10, the car engaging member 40 is removed from the arm element 32, and the inner end 46 is positioned in the joint 21 with either the trunk lid 14 or hood 16 in their open positions, as the case may be. The trunk lid 14 or hood 16 are then closed resulting in the car engaging member 40 being secured in place. The arm element 32 is then fitted into the space between ears 42 and 44 until the serrations 52 mate with the serrations 50 on the base 48 of the car engaging member 40 and the remainder of the bracket 10 is in the upright position. Wing nut 51 is then tightened on bolt 53 to secure the car engaging member 40 to the arm element 32. The brace 70 is then positioned on foot member 64 so that the free ends of arms 74 and 76 are in engagement with surface sections of either the rear fender 18 or front fender 20. The brace 70 is fixed in place on the foot member 64 by tightening the wing nut 82 on bolt 84. With brackets 10 secured in place as shown in FIG. 1, long articles may be placed in the article carrying sections 30 and secured on the brackets 10 by an expandable and rectractable elastic rope 90. Regularly spaced notches 92 are formed in the inner member 24, outer member 26 and outer strut 62 for receiving portions the rope 90 and thereby assist in holding the rope in place as it secures the articles on a bracket 10. The rope 90 is provided with hooks 94 which may be joined to hold the rope 90 together as it secures articles on a bracket 10.

When a bracket 10 is secured in place with the car engaging member 40 in a rear or front joint 21, the lower inner end section of the arm element 32 is close to or in actual engagement with a trunk lid 12 or hood 14, as the case may be.

The bracket 10 may be secured with the rear of a hatchback styled car by using a car engaging member 40' as shown in FIG. 6 having an inner end 46' formed at an angle whereby the steep angled joint formed between the back facing door and side panel or rear fender will conform essentially to the shape of the inner end of the car engaging member 40. The remaining elements of the bracket 10 will be the same as the bracket described for use with a conventional car 12.

It should now be clearly apparent that the article carrying bracket 10 of this invention is efficient and versatile in its use and provides the advantages described in the introductory sections of this specification. Only three essential parts are needed, all of which may be efficiently and reasonably inexpensively produced. The bracket 10 may be simply secured in place without the need of any tools. Also, skis and other like articles may be carried by a pair of brackets 10 secured to the hood section of a car. When the bracket 10 is no longer needed, it may be simply removed from the car and conveniently stored in the trunk of the car or elsewhere. Because of the position adjustability of the car engaging member 40 and brace 70, the bracket 10 is readily useable on cars of varying shapes and dimensions.

While I have shown and described a present preferred embodiment of this invention, it is to be distinctly understood that the invention is not limited thereto, but may be otherwise embodied within the scope of the following claims.

I claim:

1. A car-mounted article carrying bracket, comprising:
    an upright inner member;
    an upright outer member spaced from said inner member;
    a base member interconnected between the lower ends of said inner and outer members to define an article receiving section;
    an arm element fixed to and extending inwardly from a lower end portion of said inner member;
    a car engaging member having an outer end section removably secured to said arm element and an inner end section shaped to be received in a joint between a fixed car panel and a movable car panel movable between an open and closed position;
    said car engaging member being selectively adjustable in position with respect to said arm element;
    said arm element being sized and shaped such that the lower inner end section thereof will engage an upper portion of the movable car panel when said car engaging member is received in the joint between the fixed and movable car panels and the movable car panel is in the closed position;
    strut means extending downwardly from either or both of the lower end sections of said inner and outer members; and
    brace means secured to a lower end portion of said strut means for firmly engaging a side section of a car when said arm element and said car engaging element are in engagement with the car.

2. A car-mounted article carrying bracket as set forth in claim 1 wherein said brace means is selectively adjustable in position with respect to said strut means.

3. A car-mounted article carrying bracket as set forth in claim 1 including removable securing means engageable with at least two of said inner member, outer member, and strut means for holding in place articles positioned in said article receiving section.

4. A car-mounted article carrying bracket as set forth in claim 1 wherein said car engaging member and said arm element each have interconnecting surface elements for fixing the positions of said car engaging member and said arm element with respect to each other.

5. A car-mounted article carrying bracket as set forth in claim 4 wherein said interconnecting surface elements of said car engaging member and said arm element are teeth-like serrations.

6. A car-mounted article carrying bracket as set forth in claim 3 wherein said securing means includes an expandable and retractable rope; and said inner member, outer member, and strut means have surface notches sized to snugly receive sections of said rope.

7. A car-mounted article carrying bracket as set forth in claim 1 wherein said brace means is a generally T-shaped brace having a central leg with its outer end removably secured to a lower end portion of said strut means, and oppositely extending arms fixed to the inner end of the central leg, and the ends of said arms being sized and shaped to firmly engage a side section of a car when said arm element and said car engaging element are secured with the car.

* * * * *